Dec. 6, 1966 W. M. ANDERSON 3,289,460
MELTING POINT DETERMINING APPARATUS
Filed Feb. 2, 1965 2 Sheets-Sheet 1
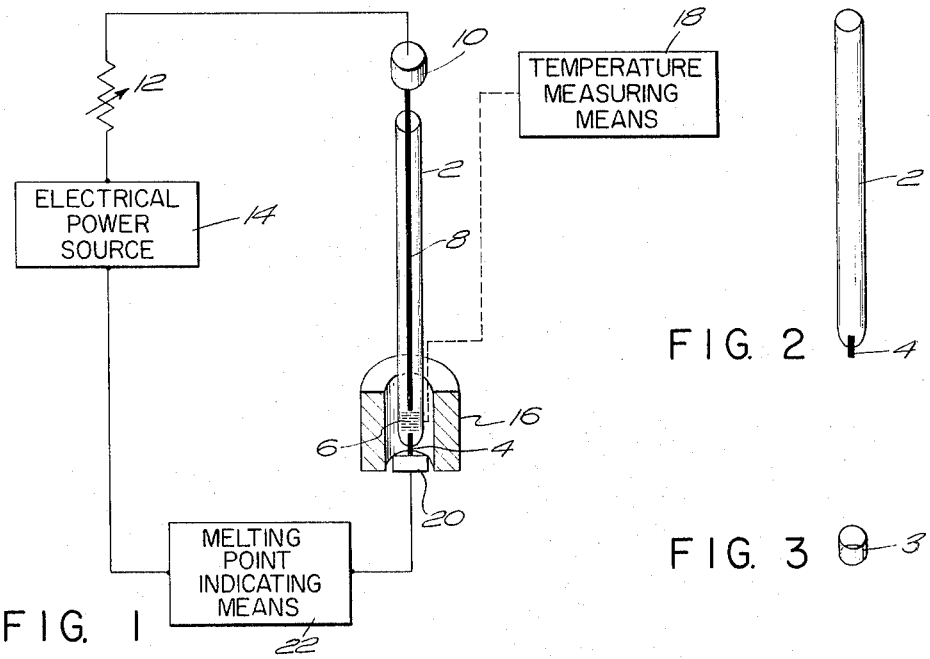
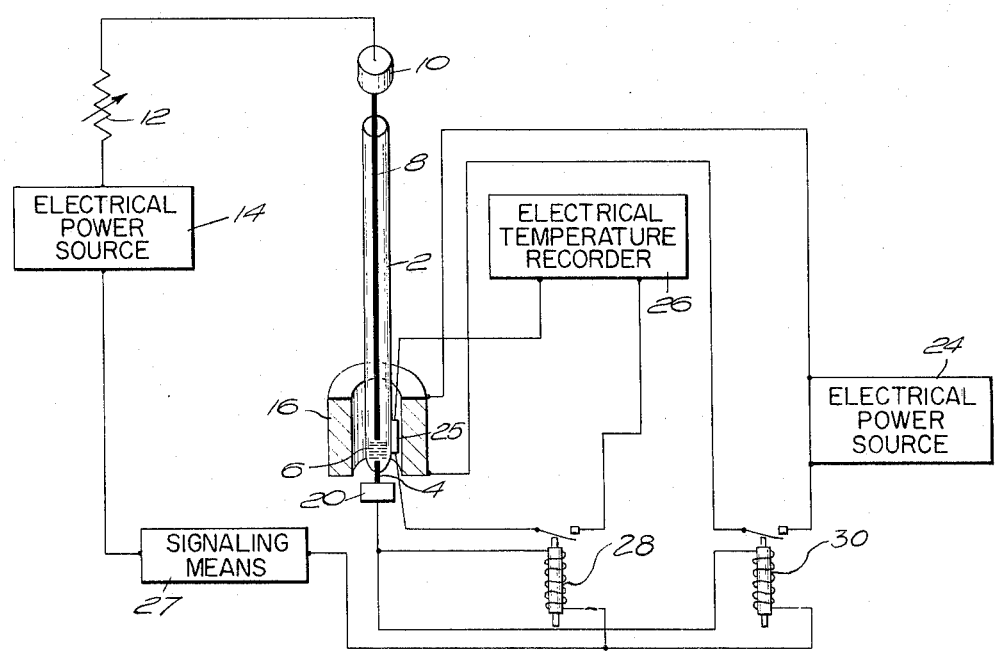
INVENTOR.
WILLIAM M. ANDERSON
BY
William M. Anderson
ATTORNEY

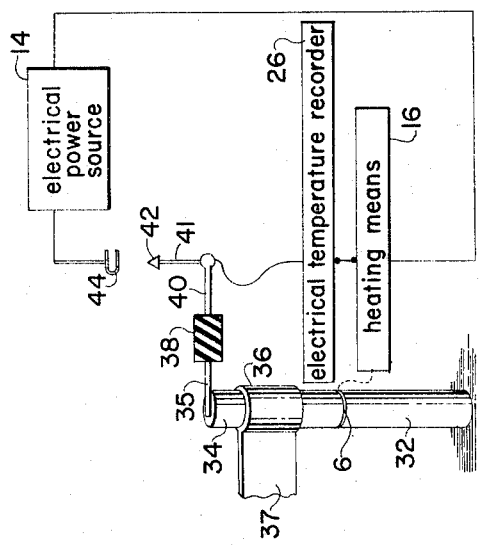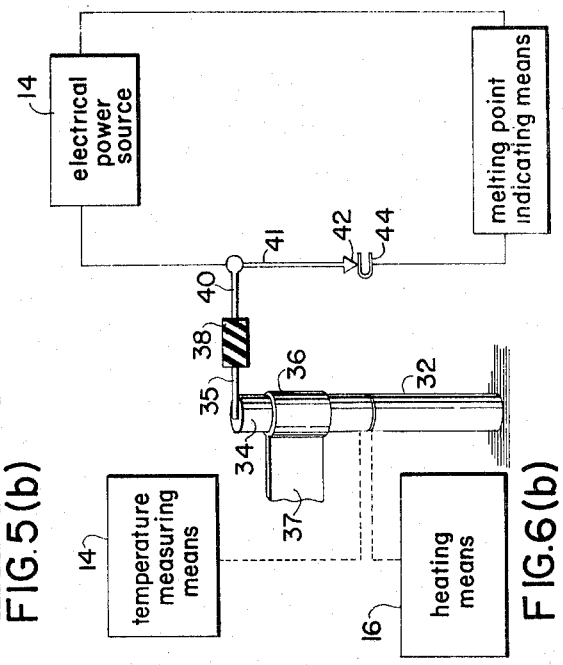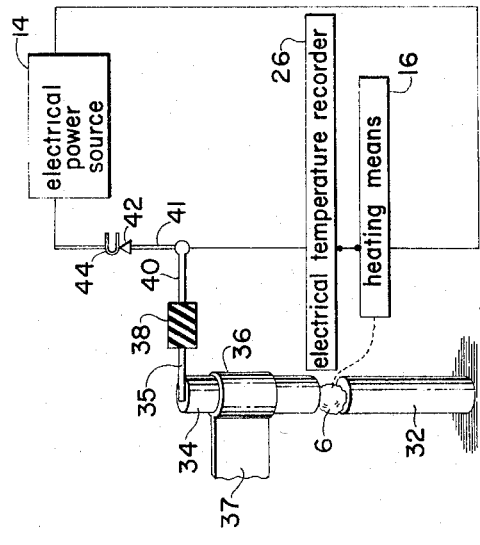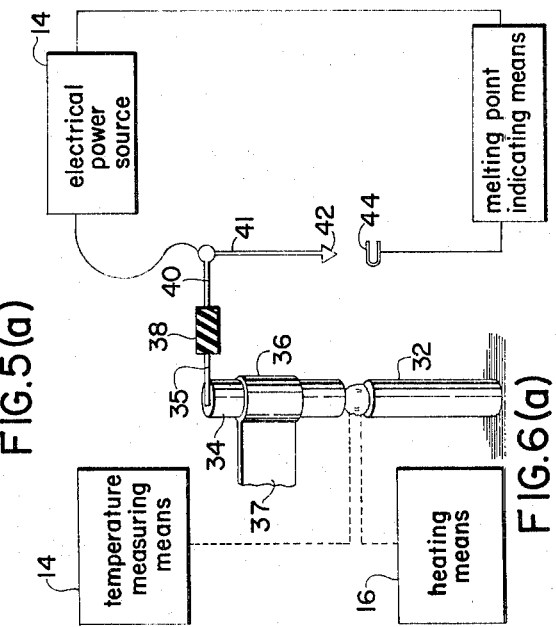

United States Patent Office 3,289,460
Patented Dec. 6, 1966

3,289,460
MELTING POINT DETERMINING APPARATUS
William M. Anderson, 154 Atlantic St., Quincy, Mass.
Filed Feb. 2, 1965, Ser. No. 431,770
4 Claims. (Cl. 73—17)

The present application is a continuation-in-part of my copending application Serial No. 180,445, filed March 19, 1962, now abandoned.

The present invention is concerned with apparatus for determining the melting point of chemical components and more particularly with apparatus for automatically determining said melting points.

One object of the present invention is to provide apparatus for automatically recording the temperature at which a chemical compound, and especially an organic chemical compound changes from a solid to a liquid state.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic, schematic illustration of one embodiment of the invention;

FIG. 2 is a perspective view of a melting point tube for use in the methods and apparatus of the present invention;

FIG. 3 is a perspective view of a chemical receptacle for use in the apparatus of the present invention;

FIG. 4 is another diagrammatic schematic illustration of another embodiment of the invention.

FIGS. 5a and 5b are further diagrammatic, schematic illustrations of still another embodiment of the present invention; and FIGS. 6a and 6b are still further diagrammatic, schematic illustrations of a further embodiment of the present invention.

Melting point tests are widely used to determine the identity and purity of chemical compounds. At the present time, such tests are run by putting the chemical, to be tested, in thermal contact with a heating element and a temperature measuring element. The temperature of the heating element is slowly raised, under the observation of an operator, until the chemical melts. At this point, the operator observes and records the temperature. As can be seen such a method requires the constant attention of an operator and runs into considerable expense. The present invention is concerned with providing methods and apparatus which will eliminate the need for the constant attention of such an operator.

Generally, the apparatus of the present invention comprises means for holding the compound to be tested, means for heating said compound, means for measuring the temperature of said compound, a movable member which engages said compound and is prevented from moving when said compound is in the solid state but being movable when the compound melts and an electrical circuit comprising means for signifying that the melting point has been reached, which circuit is coupled to the movable member and is responsive to the movement of the movable member in a manner such that the melting point signifying means is actuated when said member moves. In simple inexpensive embodiments, the means for signifying that the melting point has been reached may comprise means for giving off a sensible signal, i.e., a signal observable by the senses, e.g., a bell, buzzer, light, etc., which would tell the operator to observe the temperature measuring means, e.g., a common mercury thermometer. In more elaborate embodiments, the melting point signifying means includes means for bringing about the automatic recording of the melting point.

In one embodiment of the present invention, the movable member, the compound to be tested and the means for holding the compound are placed in a circuit comprising the melting point signifying means. The movable member engages the compound to be tested and is biased or forced towards the compound holding means by a suitable force, e.g., gravity springs, weights, etc. The force is usually such that the movable member will not contact the holding means as long as the compound to be tested is in a solid state. The current in the circuit is regulated so that the melting point signifying means will not be actuated as long as the compound to be tested and its attendant resistance are in the circuit. When the melting point is reached, the compound to be tested becomes a liquid and is no longer able to prevent the movable member from contacting the holding means, thus substantially eliminating the compound to be tested and its attendant resistance from the circuit. With the elimination of this resistance, the melting point signifying means is actuated to indicate the melting point has been reached.

Referring now to FIGURE 1, there is shown a diagrammatic, schematic illustration of an apparatus within the scope of the present invention wherein the compound to be tested is placed in a circuit comprising the melting point signifying means. As shown therein, holding means, e.g., a melting point tube 2, having an electrical contact 4 fused into its closed end rests on a contact table 20. The lower terminal end of the contact 4 makes a connection with the contact table 20 and the upper terminal end of the contact 4 extends into the melting point tube 2 and engages the bottom portion of the compound to be tested 6. A movable conductive member 8 extends downward into the melting point tube 2 and rests on the upper portion of the material to be tested 6. The movable member 8 bears on its upper terminal end a small weight 10 which forces or biases it towards the contact 4. The movable member 8 and the contact 4 are joined through a circuit comprising a variable resistor 12, a source of electrical power 14, e.g., a battery, and melting point signifying means 22, e.g., a bell, buzzer, light, etc. The portion of the melting point tube 2 which is adapted to receive the compound to be tested 6 is intimately associated or in thermal contact with heating means 16 and temperature measuring means 18, e.g., a mercury thermometer, a metallic thermometer, an electric thermometer, etc.

During use, the power is turned on in the circuit comprising the contact 4, the movable member 8, the material to be tested 6, and the melting point signifying means 22 and the current is adjusted by variable resistor 12 so that the melting point indicating means is not actuated prematurely. The temperature of the heating element 16 is then gradually raised until the compound to be tested 6 melts. At this point the contact 4 and movable member 8 come together thus substantially eliminating the compound to be tested from the circuit and actuating the melting point signifying means 22. On receiving the signal from the melting point signifying means 22, the operator observes the temperature measuring means 18.

In FIG. 2, there is shown therein a simple melting point tube 2 having a contact 4 fused into its base, which can be used as holding means in the apparatus of the present invention. Such tubes may be readily prepared, for example, by placing a simple piece of wire in the base of the tube 2 prior to fusion. In such tubes, the contact 4 may also serve as heat exchange means to convey heat from the heating means to the material to be tested. When desired, a simple cylinder 3 (FIG. 3), e.g., of glass, having two open ends may be used in place of the melting point tube to hold the material to be tested 6. When used, the cylinder 3 may be placed directly on the contact table 20. The movable member 8 may be held upright by a channel or sleeve (not shown) provided in the apparatus.

As set forth above, the current, which is applied to the circuit comprising the movable member 8, the contact 4, the compound to be tested 6 and the melting point signifying means 22, is such that the melting point signifying means 22 will not be actuated until the resistance due to the compound to be tested is removed from circuit. Generally, the compounds to be tested will be of an organic nature and thus be nonconductors or very poor conductors. In one of the preferred embodiments of the present invention, the voltage applied to the circuit, is such that it is insufficient to overcome the resistance due to the compound to be tested 6 so that the circuit remains open until melting occurs and the movable member 8 engages the contact 4. In such a preferred embodiment the voltage in the circuit may be set by the simple variable resistor 12. In setting the voltage, care should be taken to leave a sufficient margin to allow for possible increased conductance of organic materials on being heated. Care should also be taken in setting the voltage to prevent sparking between the movable member 8 and the contact 4. Such sparking may also be prevented by increasing the distance by which the movable member and contact 4 are spaced apart by the compound to be tested and also by the closeness of the packing of said compound 6 in such space.

In further useful embodiments of the above, the melting point signifying means 22, e.g., buzzers, bells, etc., may be adapted or biased, by known means, so that a set minimum level of current is necessary for their actuation. In such an embodiment, the current, which is applied to the circuit, comprising the biased signifying means, is regulated by the variable resistor 22 so that the necessary minimum will only flow in the circuit when the resistance attendant the compound to be tested is removed. As will be understood, such an embodiment will permit the apparatus to be used on conductive compounds.

In more elaborate embodiments of the present invention, the apparatus is equipped to automatically record the temperature at which melting took place. In such embodiments, the melting point signifying means includes means for shutting off at least one of the temperature measuring means and the heating means, and the temperature measuring means includes means for recording the maximum temperature reached when said temperature measuring means and/or the heating means were shut off. The means for shutting off the temperature measuring means and/or the heating means may, for example, be simple circuit control means, e.g., solenoids, relays, etc., which are available commercially. Similarly, temperature measuring means having means for recording the maximum temperature reached are also commercially available, e.g., electrical and bimetallic thermometers having a recording graph thereon for plotting the temperature. Other examples of such thermometers are electric or bimetallic strip thermometers having a drift needle thereon which follows the temperature indicating needle and remains at the maximum temperature reached when the temperature indicating needle recedes, and simple mercury thermometers having a drift needle thereon which rides on the top of the mercury column and remains at the highest point reached when the column of mercury recedes.

Referring now to FIG. 4, there is shown therein a diagrammatic schematic illustration of an automatic embodiment within the scope of the present invention. Said apparatus comprises, as did the apparatus shown in FIG. 1, a melting point tube 2 having a first contact 4 fused in its base and resting on a contact table 20 and a conductive movable member 8, inserted from the top, and bearing a weight 10 on its upper end. The space between the contact 4 and movable member 8 contains a compound to be tested 6 and is intimately associated with heating means 16 and a thermal responsive element 25, e.g., a thermocouple. The heating means 16 is connected to a second electrical power source 24 and the thermal responsive element 25 is connected with electrical temperature recording means 26. The circuit comprising the contact 4 and movable member 8 also comprises a variable resistor 12, a first source of electrical power 14, a first solenoid 28 which is adapted when actuated, to break a circuit in the electrical temperature recorder 26, a second solenoid 30 which is adapted, when actuated, to break the circuit comprising the heating means 16, and signaling means 27, e.g., a bell, buzzer, etc. During use, the circuit comprising the electrical temperature recorder 26 and the circuit comprising the contact 4 and movable member 8 are first closed. The current flowing in the circuit comprising the contact 4 and movable member 8 is varied by means of variable resistor 12 until the first 28 and second 30 solenoids and the signaling means are not prematurely actuated. The circuit comprising the heating means 16 is then closed and the temperature is gradually raised. When melting occurs the contact 4 and movable member 8 come together, eliminating the resistance attendant the compound to be tested 6 and actuating the first solenoid 28, the second solenoid 30 and the signaling means 27. The first solenoid 28 breaks a circuit in the electrical temperature recorder and thus indicates the melting point temperature, the second solenoid 30 shuts off the heating element 16 and the signaling means gives an audio or video signal.

Although in the embodiments described above, the current flowing in the circuit is used directly to actuate the melting point indicating means, it should be understood, that when desired, amplifying means may be employed. The employment of such amplifying means permits the use of lower voltages in the electrode circuit and thus increases the relative significance of the resistance of the material to be tested.

In especially useful embodiments of the present invention, the compound to be tested is not placed in the circuit comprising the melting point signifying means. This arrangement is particularly advantageous in that it is in no way dependent upon the conductive properties of the compound to be tested. In embodiments of this type the circuit comprising the melting point signifying means is coupled to the movable member preferably through circuit control means which are responsive to the movement of the movable member and make or break a circuit upon the movement of said member. In certain embodiments of this type the circuit control means may act as the melting point signifying means and shut off at least one of the temperature measuring means and heating means and bring about the recording of the melting point in a manner such as described above. In other embodiments, the circuit control means may make a circuit which will activate the melting point signifying means, e.g., buzzers, lights, and solenoids for shutting off the heat and temperature recording means.

Referring to FIGS. 5a and 5b, there is shown an embodiment wherein the compound to be tested is not placed in circuit and the circuit is opened in response to the movement of the movable member. As shown therein, the compound to be tested 6 is placed between the holding means 32, which is generally stationary and the movable member 34 which is free to move in sleeve 36 which is held by arm 37. The top of movable member 34 is fixedly attached to a first rod 35 which is coupled through an insulating coupler 38 to a second rod 40 which, in turn, is fixedly attached to a third rod 41 formed of a conductive material. The third rod 41 extends upwardly and terminates in a first electrical contact 42 which in FIG. 5a touches a second electrical contact 44 in the circuit comprising the electrical power source 14 and thereby closes said circuit. The circuit also controls the heating means 16 and the electrical temperature recorder 26. When the compound melts, the movable member 34 moves towards the holding means 32 and in response thereto contacts 42 and 44 separate as shown in FIG. 5b to break the circuit, thus causing the melting point temperature to be recorded on the temperature recorder.

In FIGS. 6a and 6b there is shown an embodiment wherein the circuit is closed in response to the movement of the movable member. As can be seen, this embodiment is similar to that shown in FIGS. 5a and 5b, except that third rod 41 extends downwardly and the first contact 42 does not touch the second contact 44 in the circuit when the compound is unmelted. Upon melting, as shown in FIG. 6b, contacts 42 and 44 come together and close the circuit, thus actuating the indicating means, e.g., a buzzer. As can be understood, the circuit, when it is desired, may also comprise means for shutting off at least one of heating means and temperature measuring means and bring about the automatic recording of the melting point in a manner such as illustrated above.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An apparatus for determining the melting point of a chemical compound, said apparatus comprising:
   (a) Means for holding the compound to be tested:
   (b) A movable member, said movable member engaging said compound and being prevented from moving when said compound is in the solid state but being movable when said compound melts;
   (c) Means for heating said compound:
   (d) Means for measuring the temperature of said compound, and
   (e) An electrical circuit comprising:
   (f) Means for signifying that the melting point has been reached, said movable member and said holding means being connected to said circuit, said holding means holding the compound to be tested in said circuit between said movable member and said holding means, said movable member being movable and contactable with the holding means when said compound melts and the current in said circuit being insufficient to actuate said melting point signifying means until the resistance attendant said compound is removed from said circuit upon melting.

2. An apparatus as defined in claim 1 wherein said means for measuring the temperature of said compound includes means for recording the maximum temperature reached and said means for signifying that the melting point has been reached, comprises means for shutting off at least one among said temperature measuring means and said heating means.

3. An apparatus for determining the melting point of a chemical compound, said apparatus comprising:
   (a) Means for holding the compound to be tested:
   (b) A movable member, said movable member engaging said compound and being prevented from moving when said compound is in the solid state but being movable when said compound melts:
   (c) Means for heating said compound.
   (d) Means for measuring the temperature of said compound including means for recording the maximum temperature.
   (e) Circuit control means controlling a circuit for shutting off at least one among said heating means and said temperature measuring means and
   (f) Coupling means between said movable member and said circuit control means whereby upon the movement of said movable member said circuit control means is actuated to shut off at least one among said heating means and said temperature measuring means and thereby bring about the recording of the melting point by the means for recording the maximum temperature reached.

4. An apparatus for determining the melting point of a chemical compound, said apparatus comprising:
   (a) Means for holding the compound to be treated.
   (b) A moveable member, said moveable member engaging said compound and being prevented from moving when said compound is in the solid state but being moveable when said compound melts;
   (c) Means for heating said compound.
   (d) Means for measuring the temperature of said compound.
   (e) Circuit control means controlling a circuit comprising means for giving off a sensible signal and
   (f) Coupling means between said movable member and said circuit control means whereby upon the movement of said moveable member the circuit control means is actuated and a sensible signal is given off to notify the operator to observe the melting point on the temperatures measuring means.

References Cited by the Examiner

UNITED STATES PATENTS

| 2,670,624 | 3/1954 | Faris et al. | 73—15.6 |
| 3,150,514 | 9/1964 | Berhenke | 73—17 |
| 3,233,446 | 2/1966 | Ceglia | 73—17 |
| 3,245,249 | 4/1966 | Berhenke et al. | 73—17 |

OTHER REFERENCES

"M.P. Determination Goes Automatic," Chemical and Engineering News, September 19, 1960, page 77.

JAMES J. GILL, *Acting Primary Examiner.*

RICHARD C. QUEISSER, ROBERT L. EVANS,
*Examiners.*

JACK C. GOLDSTEIN, *Assistant Examiner.*